Jan. 8, 1957 V. H. ORTEGREN ET AL 2,776,822
RECTIFYING STILL
Filed Oct. 21, 1954

V. H. ORTEGREN
K. P. DIMICK
INVENTORS

BY
ATTORNEY

United States Patent Office 2,776,822
Patented Jan. 8, 1957

2,776,822

RECTIFYING STILL

Victor H. Ortegren, Pleasant Hill, and Keene P. Dimick, Walnut Creek, Calif., assignors to the United States of America as represented by the Secretary of Agriculture Application October 21, 1954, Serial No. 463,839

1 Claim. (Cl. 261—114)

(Granted under Title 35, U. S. Code (1952), sec. 266)

A non-exclusive, irrevocable, royalty-free license in the invention herein described, for all governmental purposes throughout the world, with the power to grant sublicenses for such purposes, is hereby granted to the Government of the United States of America.

This invention concerns devices useful for conducting distillations, especially those in which materials of close boiling points can be separated from one another. One object of the invention is to provide a still of novel construction which exhibits superior distilling efficiency. Further objects and advantages of the invention will be obvious from the description herein.

Figure 1:
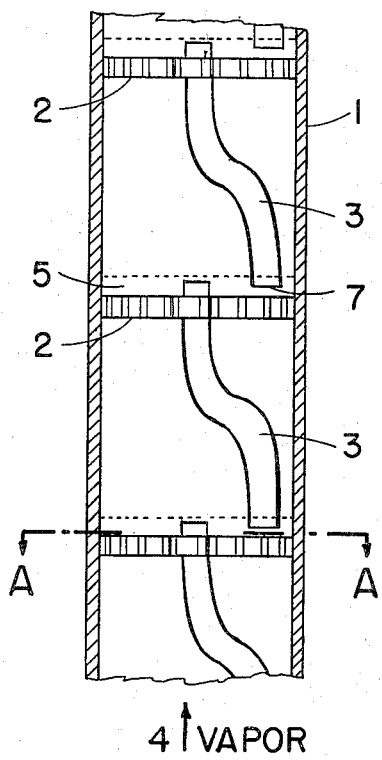
Figure 2:
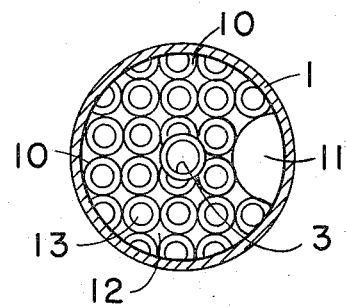
Figure 3:
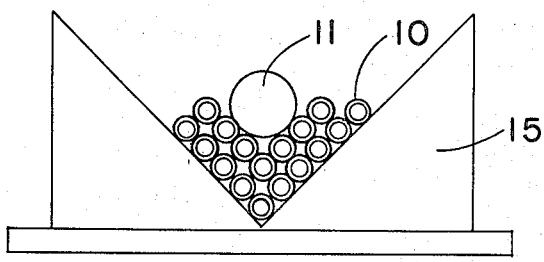

The annexed drawing illustrates devices within the scope of this invention. In the drawing Fig. 1 represents a still column, part of the shell of the column being torn away to make visible the interior construction. Fig. 2 is a cross-section taken on plane A—A of Fig. 1. Fig. 3 is a front elevation of elements assembled for fabrication into a still plate. In the device of the figures all parts, unless otherwise specified, are made of glass.

In the art of distillation many types of still plates are known and used. In the case of laboratory stills it is desirable to use glass apparatus to prevent contamination of reagents, etc. The fabrication of efficient plates from glass is difficult because of the structural characteristics of glass and most laboratory still plates do not give efficiencies anywhere near the theoretical. For example it is common practice in constructing glass still plates to flare out a piece of glass tubing. The flared portion is then drilled and serves as the plate—that is, the horizontal portion of the still up through which the vapor moves to contact the liquid residing on top of the plate. Such a method of fabrication provides a very inefficient plate. The main point is that the thin piece of glass (the flared out portion) cannot be provided with enough holes without its losing all structural strength. As a result the number of holes must be limited whereby distillation efficiency is low because of poor contact between liquid and vapor. Further, because of the small hole area of the plate, there is considerable resistance to vapor flow and the capacity of a still made with such plates is low.

It has now been found that efficient still plates can be produced without the necessity for drilling holes through a thin disc or the like. By eliminating this drilling operation, the danger of breakage during fabrication is eliminated. At the same time the plate can be produced with a greater open (hole) area than is possible with drilling and further the plate has great structural strength in spite of its having more open area than a thin drilled disc. Further, in the plate of this invention, the ratio of the area of the holes to the area of the glass is much greater than in plates made by drilling discs. As a result, a still made with the plate of this invention has a high capacity, the pressure drop in the still is low, and intimate contact between vapor and liquid is obtained whereby the distilling efficiency of the still is very high.

Briefly described the plate in accordance with this invention comprises a plurality of short tubes arranged in parallel fashion with their axes normal to the surface of the plate. These short tubes are fused together at their points of contact to form a unitary integral body. The method of fabrication in accordance with this invention also permits fusing a solid rod in the bundle of tubes, this solid rod functioning as a vapor block to prevent vapor from interfering with liquid flow as explained hereinafter. The still plates of this invention because they are a fused mass of short tubes have great structural strength as compared to the drilled disc and they exhibit greater open area available for flow of vapor without sacrificing strength. It has been found that columns made up of plates in accordance with this invention are very efficient providing up to 70% of theoretical efficiency in distillations of water-alcohol solutions.

Referring now to Fig. 1, this figure illustrates a portion of a still column in accordance with this invention. In this figure conventional parts such as the inlet for the vapors, outlets for distillate and distilland, reflux inlet, etc. are not depicted.

The still column consists of a cylindrical shell 1, vertically spaced plates 2, and downcomers or conduits 3. As in conventional distillation practice the vapors to be rectified move upwardly through the column as represented by arrow 4 whereas the refluxing liquid moves downwardly from plate to plate via conduits 3. As in conventional practice the refluxing liquid forms a pool 5 on the top of each plate and since the plates are perforated, the vapor bubbles up through these perforations. At each plate the upper end 6 of the corresponding conduit 3 is elevated somewhat above the surface of the plate so that the depth of the pool is maintained at the desired level.

Referring now to Fig. 2, each plate is made up of a series of short lengths of glass tubing 10 and a short length of solid glass rod or slab 11 of the same length as the tubes. All of these elements are fused together at their points of contact to form a unitary body. In each case, the lower end 7 of conduit 3 is positioned over solid slab 11. This has the function that under normal operation the vapor will not ascend through conduit 3. As a result, in conducting a distillation the liquid can flow freely from one plate to the next lower plate without being impeded by the countercurrent flow of vapor. During the distillation, the vapor flows upwardly through the plates—that is, through interstices 12 between tubes (or between tubes and rod) and through apertures 13. In operation, the pressure of the upwardly moving vapor mass prevents liquid from moving down through interstices 12 or apertures 13. For best results, it is preferred that tubes 10 be arranged in aligned parallel rows as shown in Fig. 2. By this symmetrical stacking the interstices 12 between adjacent tubes are uniform in cross-section and are of maximum open area. For example, when using glass tubing of standard wall thickness, the total area of interstices 12 will be about 96% of the total area of apertures 13.

In Fig. 3 is depicted the method for initiating fabrication of the plates. Thus a series of glass tubes 10 of any desired length and a glass rod 11 of the same length as the tubes are assembled in a V-jig 15 made of brass or other metal. The tubes 10 are arranged in parallel aligned rows as depicted with the rod 11 nesting in the V formed by the arrangement of tubes. (In the drawing a limited number of tubes are depicted. Obviously in practice any number of tubes may be used depending on the size of the finished plate to be constructed.) The jig and assembled tubes and rod are then placed in a furnace where they are subjected to heat treatment at a temperature and for a time sufficient to cause the contacting portions of the tubes and rod to be sintered together to form a unitary body. The necessary time and temperature will vary depending on the chemical and physical properties of the glass being used. For example with boro-silicate glasses a temperature of 1520° F. applied for about 2 minutes is generally adequate. After sintering it is preferred to slowly reduce the temperature to prevent formation of areas of strain. The cooled, annealed body of fused tubes and rod is then drilled in a direction parallel to the length of the tubes and rod to provide a hole for eventual insertion of conduit 3. The drilled body is then cut with a core drill so as to present a circular cross-section with the recently drilled hole as the center. The body now of cylindrical shape is sawed into circular plates cutting transversely to the length of the tubes and rod. The product of these operations will be a still plate as depicted in Fig. 2, except that tube 3 will not be in place as in the figure. The still plates so produced are assembled together with conduits 3 and shell 1 by conventional glass-blowing techniques into a still column.

It is obvious that if desired the initial assembly of tubes and rod may include a centrally located tube of larger diameter than tubes 10 which tube would eventually be available for fusing to other sections of tubing to form the downcomers 3. This method of fabrication would eliminate necessity for drilling the sintered bundle of tubes and rod.

Having thus described the invention, what is claimed is:

A rectifying still comprising a cylindrical shell, a plurality of vertically spaced plates within said shell, a downcomer conduit for carrying liquid from one plate to the next lower plate, each of said plates being a fused, integral bundle of short glass tubes and a slab of solid glass, said tubes and slab having their axes vertical, said slab of solid glass being positioned directly beneath the lower end of the downcomer conduit and having an area at least as great as that of the lower end of the downcomer conduit.

References Cited in the file of this patent

UNITED STATES PATENTS

| | | |
|---|---|---|
| 2,484,003 | Simison | Oct. 4, 1949 |
| 2,575,193 | Shire | Nov. 13, 1951 |
| 2,718,901 | Nutter | Sept. 27, 1955 |

FOREIGN PATENTS

| | | |
|---|---|---|
| 425,413 | Great Britain | Mar. 11, 1935 |
| 507,711 | France | July 2, 1920 |
| 1,060,397 | France | Nov. 18, 1953 |